(12) United States Patent
Roman

(10) Patent No.: US 6,505,991 B2
(45) Date of Patent: Jan. 14, 2003

(54) SELF-CENTERING SHAFT ADAPTER

(75) Inventor: Timothy S. Roman, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 105 days.

(21) Appl. No.: 09/814,312

(22) Filed: Mar. 21, 2001

(65) Prior Publication Data

US 2002/0136602 A1 Sep. 26, 2002

(51) Int. Cl.[7] .............................. B65G 3/20; F16B 2/00; F16B 7/04
(52) U.S. Cl. ...................... 403/261; 403/256; 403/373; 403/374.1; 403/374.2; 403/374.3
(58) Field of Search .......................... 403/109.1, 109.6, 403/109.7, 110, 256, 261, 373, 374.1, 374.2, 374.3, 377

(56) References Cited

U.S. PATENT DOCUMENTS

| 9,123 | A | * | 7/1852 | McWilliams ................ 368/247 |
|---|---|---|---|---|
| 1,969,827 | A | * | 8/1934 | Tautz ........................... 279/44 |
| 2,428,688 | A | * | 10/1947 | Stischer ....................... 279/67 |
| 3,595,505 | A | * | 7/1971 | Burwell et al. ............. 248/539 |
| 3,849,008 | A | | 11/1974 | Boucher et al. |
| 3,880,534 | A | | 4/1975 | Schmidt |
| 4,354,399 | A | | 10/1982 | Katayama |
| 4,433,218 | A | | 2/1984 | Provencher |
| 4,527,440 | A | | 7/1985 | Heitman et al. |
| 5,026,197 | A | * | 6/1991 | Johnson et al. ............... 403/24 |
| 5,223,679 | A | | 6/1993 | Yoo |
| 5,509,752 | A | | 4/1996 | Kocisek ..................... 403/373 |
| 5,544,970 | A | | 8/1996 | Studer |

* cited by examiner

Primary Examiner—Gary S. Hartmann

(57) ABSTRACT

An adapter for detachably concentrically coupling shafts having a range of diameters to a rotating input actuator capable of rotating about a rotational axis is disclosed in which the force to transfer rotational torque between said shaft and a rotating input actuator to which said housing is attached is generated independent of said self-centering adjustment system.

19 Claims, 9 Drawing Sheets

SELF-CENTERING SHAFT ADAPTER

BACKGROUND OF THE INVENTION

I. Field of the Invention

The present invention relates to an apparatus for the attachment of a shaft, particularly that of a rotating control device, to an operating unit or actuator drive system. More particularly, the invention concerns a device of the class that includes a centering shaft adapter in which separate mechanisms are used to (1) accommodate shafts of varying sizes while keeping any shaft concentric with the hub of a rotating actuator or drive system attached to the adapter and to (2) generate the clamping force required to transfer the torque load between the shaft and the adapter.

II. Related Art

Many control devices include motors driving rotating hubs usually having meshing splines of a given pitch which, in turn, are used to operate a concentrically aligned rotary axle or shaft of a control device such as a butterfly ventilating valve, damper, or the like. An integral adapter device is used to directly couple the rotating output hub to an input shaft of a control device in concentric arrangement. The drive units are designed to be used with a variety of input or control device shaft sizes. However, generally in the past, it has been necessary to provide special arrangements in order to change shaft sizes. For example, a series of adapters might be used to accommodate shafts of different sizes to enable the system to maintain the desired concentric arrangement. Alternatively, a plurality of separate inserts have been devised, one for each size shaft to space the shaft from the clamp jaws the appropriate amount to maintain a concentricity with the output hub of the actuator.

Mechanical clamping devices also exist which adjust the center of the clamped shaft to maintain concentricity with a corresponding hub over a range of shaft sizes. One such device is illustrated and described in U.S. Pat. No. 5,544,970 to Studer which utilizes a hollow member having internal and external threads which cooperate to open and close upper and lower jaw members to clamp about a shaft of interest. The outer threads engage an outer housing member which, in turn, operates the lower jaw; whereas the inner threads engage a bolt that pulls on the upper jaw. A thread pitch ratio between the inner and outer threads is used to move the jaws an unequal amount so that the center between the jaws remains concentric with the axis of the hub. Although this successfully accomplishes the desired adjustment, the design has several drawbacks or limitations. First, the centering mechanism must also supply the clamping force so that it must be built to transmit the entire system torque; and second, the double-threaded member is difficult to produce and involves the utilization of a very fine pitch on the outside thread which is readily susceptible to clogging and cross threading.

Thus, there remains a definite need in the art for an adaptive coupling mechanism that utilizes parts that are readily made and provides a separate mechanism for the clamping and centering functions and which can accommodate a wide range of shaft sizes.

SUMMARY OF THE INVENTION

The present invention provides a single, relatively simple mechanism for concentrically adapting the output hub of a direct coupled actuator to operate control device shafts of varying sizes, thereby obviating the need for separate connecting devices or inserts to accommodate a range of shaft sizes. In this manner, a direct coupled actuator can be mounted on shafts of different sizes interchangeably while maintaining concentric alignment between the output hub of the actuator and the shaft of interest. In addition to being a self-centering shaft adapter, the adapter of the invention utilizes separate mechanisms to keep the shaft and output hub concentric and to generate the clamping force required to transfer the torque load from the shaft to the adapter. In this manner, the self-centering mechanism is not required to transmit the full torque load between the adapter and the clamped shaft but only to keep the shaft and output hub concentric. The system consists of opposed jaws that grip each side of the shaft and are mechanically linked to insure that both jaws travel in equal amounts with respect to the geometric center of an integral drive hub when adjusted to accommodate a shaft that is being clamped.

The mechanism may take any of several forms including double and single rack and pinion systems, beam systems, and cam and follower devices. Each of these mechanisms operates to concentrically open and close a pair of clamping jaws about a geometric center using a mechanical linkage operated by a conventional threaded fastening arrangement, as will be described.

BRIEF DESCRIPTION OF THE DRAWINGS

In the drawings, wherein like numerals designate like parts throughout the same.

DETAILED DESCRIPTION

The following detailed description describes a variety of implementations of the self-centering shaft adapter of the invention which employ several different. mechanisms. Each uses a relatively simple mechanical system to maintain concentricity between integral drive hub and control shaft which should have a long reliable life without the need for expensive, tight tolerance parts. Each of the embodiments also embraces the concept that the self-centering aspect of the mechanism which keeps the shaft and hub concentric is not used to generate the clamping force required to transfer the torque load between the clamped shaft and the shaft adapter. The following embodiments are presented as exemplary of the invention but are not meant to limit the scope of the concept in any manner. When referring to the clamping jaws or other parts of the system, the terms "upper" and "lower" refer to parts of the device as drawn and not to any particular mounted orientation.

Figure 1:
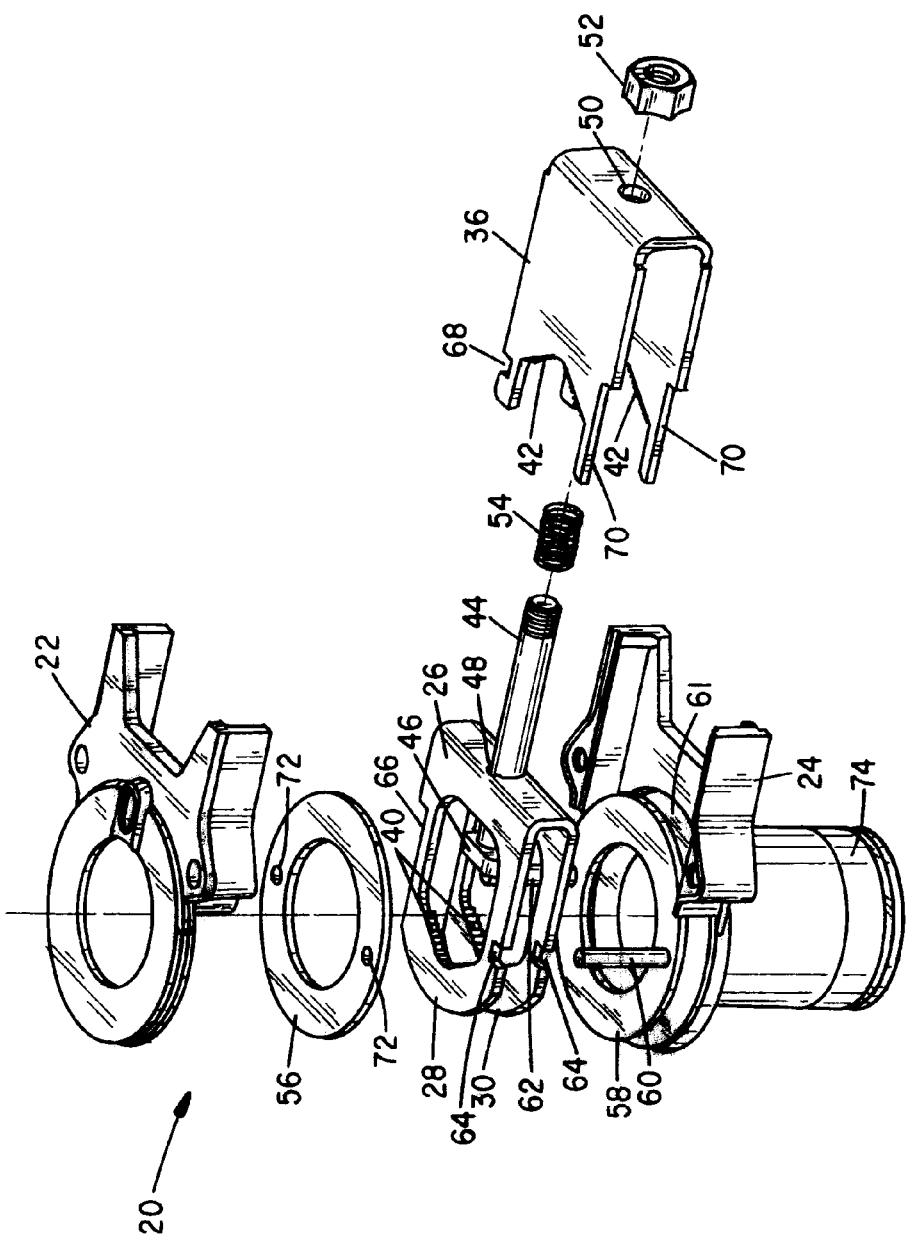
FIG. 1 is an exploded perspective view of one embodiment of the self-centering shaft adapter of the invention centered utilizing a rotating cam system.

FIG. 1 is an exploded perspective view illustrating one embodiment of a self-centering shaft adapter of the invention which employs centering cams in conjunction with opposed jaw clamps whose separation is controlled by a spring-biased T-bolt and nut. The system, generally at 20, includes an upper housing 22 and a lower housing 24 together with a generally U-shaped inner (upper) jaw clamp device 26 which has generally parallel spaced sides 28 and 30 and which is designed to be contained within and slide relative to the spaced parallel sides 32 and 34 of a rather larger generally U-shaped outer (lower) jaw clamp member 36.

The spaced parallel sides of upper jaw clamping member 26 include parallel clamping or toothed fractions 40 and the lower jaw member 36 is provided with opposed similar toothed fractions at 42. A T-bolt 44 with flattened anti-rotation head portion 46 is designed to slip through openings 48 and 50 in respective members 26 and 36 when the upper jaw clamp 26 is assembled into the lower jaw clamp 36 and nut 52 is threaded on the protruding end thereof. The opposed shaped toothed fractions 40 and 42 are caused to converge and diverge by rotation of nut 52 aided by a compression spring 54 which slides over T-bolt 44.

The system is further provided with a pair of generally flat washer-shaped spaced centering cam members 56 and 58. The centering cam device 58 is provided with a pair of follower pins 60 and 62 located on the same side of the cam member 58 spaced 1800 apart and extending perpendicular to the plane of the cam member. The cam device 58 is designed to nest in a recess 61 in lower housing 24 and rotate relative thereto. The parallel sides 28 and 30 of upper (inner) jaw member 26 are provided with aligned notches or slots 64 on one side thereof and with elongate recesses, one of which is shown at 66 on the other. The lower (outer) jaw member 36 is likewise provided with aligned notches or slots, one of which is shown at 68, and recesses 70, but is designed to be assembled in opposite side-to-side relation with respect to jaw member 26 as shown in FIG. 1. Holes 72 provided in the centering cam member 56 are designed to align with and entertain the pins 60 and 62 in the device as assembled. A driving hub 74 provided with splines (not shown) is fashioned integral with the lower housing member 24. Threaded devices such as machine screws (not shown) can be used to assemble the housing members 22 and 24 capturing the intermediate parts therebetween.

In operation, tightening of the nut 52 draws the upper and lower toothed jaw portions 40 and 42 closer together. (Note that the T-bolt head 46 is shaped with flat sides so that it cannot rotate within the lower U-portion of the upper clamp 26.) As is apparent from the figure, at the same time, the movement of the jaw clamps 26 with slots 64 causes the pins 60, 62 to rotate counterclockwise and, in turn, operate via slot 68 to displace the lower jaw member 36 an equal distant amount in the opposite direction. In this manner, using the spring 54 to maintain tension, the device will properly center about any shaft inserted through the jaws within the limits of its clamping capacity size.

Figure 2A:
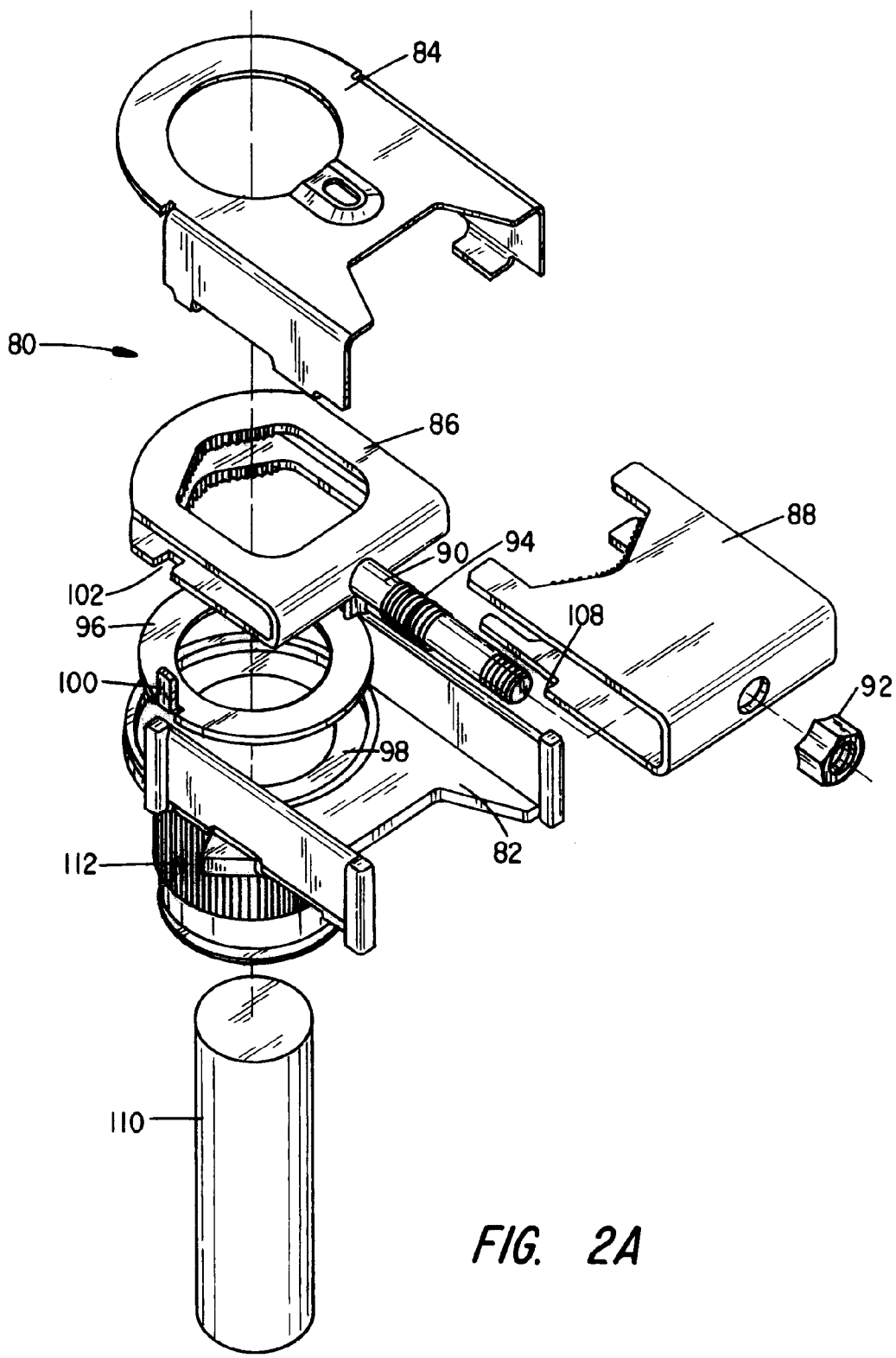
FIG. 2A is an exploded perspective view of an alternate embodiment of the self-centering shaft adapter of the invention also employing a cam system.
Figure 2C:
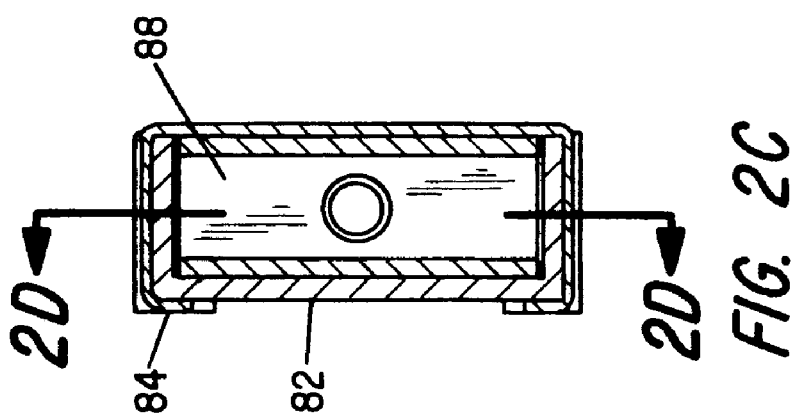
FIGS. 2C–2E represent various sectional views of the embodiment of FIGS. 2A and 2B, as noted on the drawings.
Figure 2B:
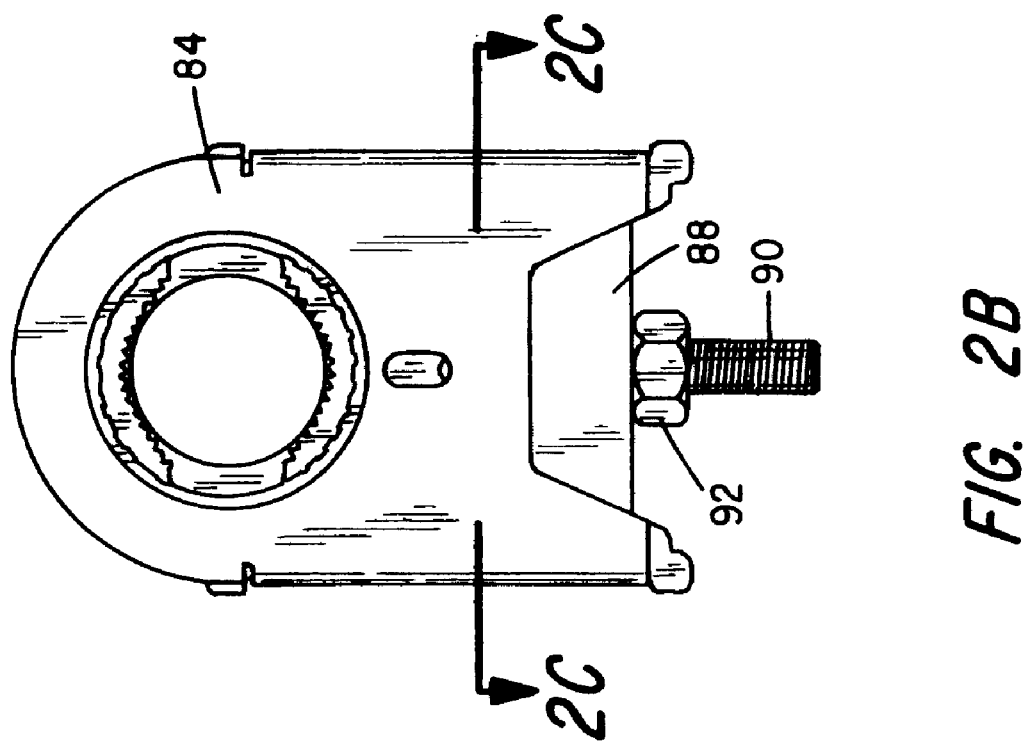
FIG. 2B is a top plan view of the embodiment of FIG. 2A in an assembled state.
Figure 2E:
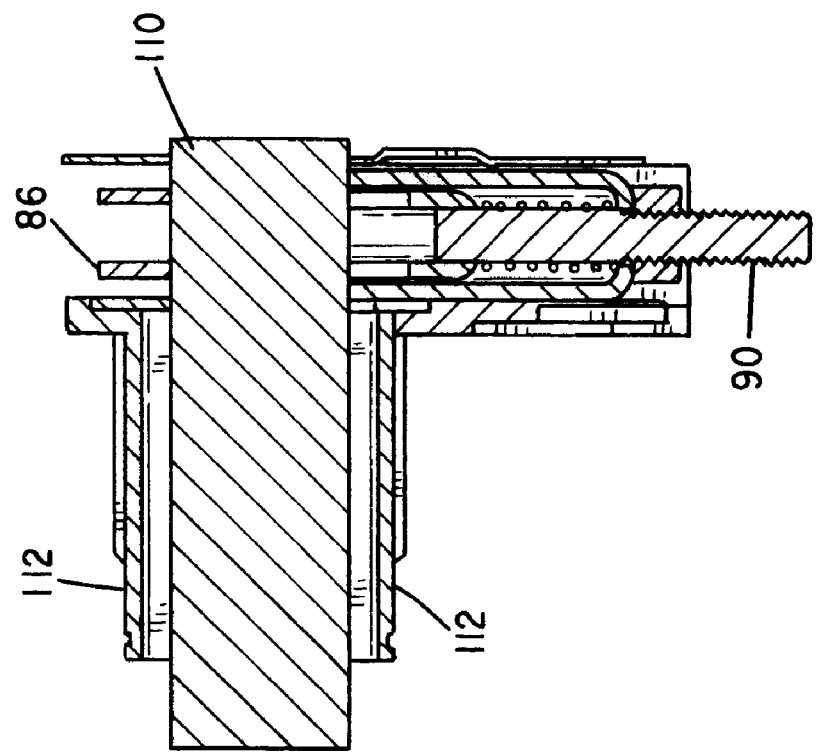
Figure 2D:
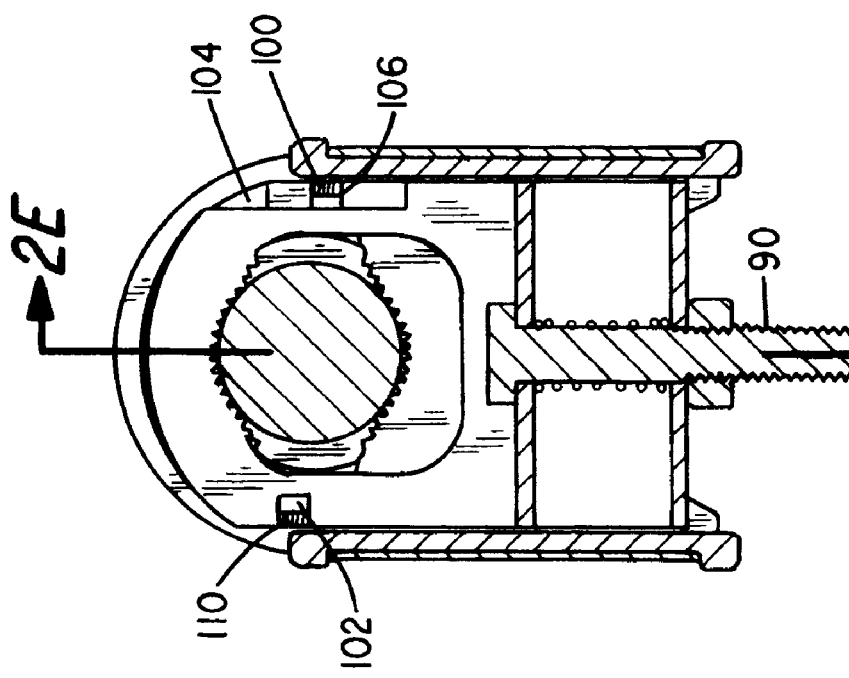
Figure 3B:
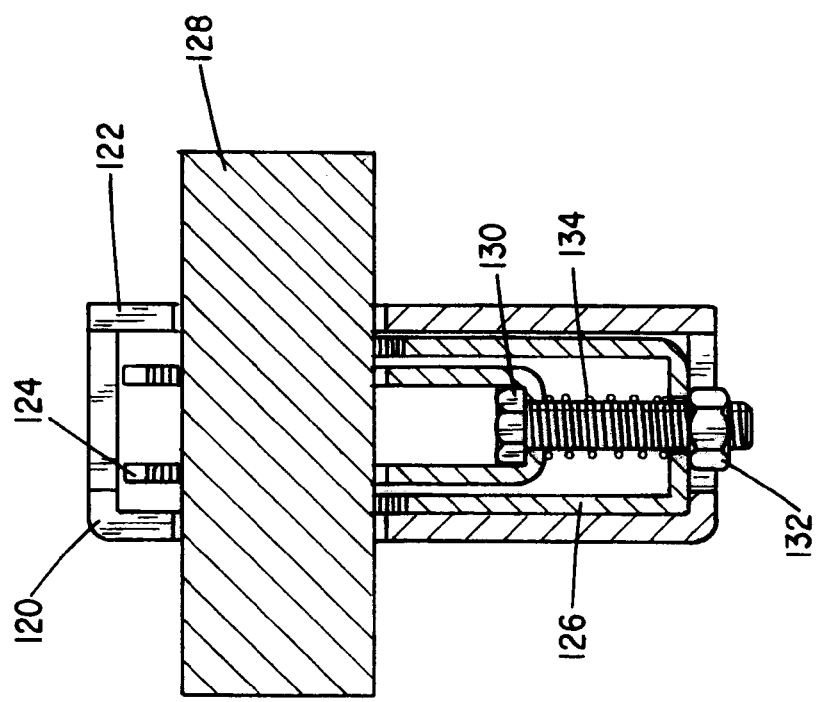
FIGS. 3B, 3D and 3E represent sectional views noted on FIGS. 3A and 3C.
Figure 3A:
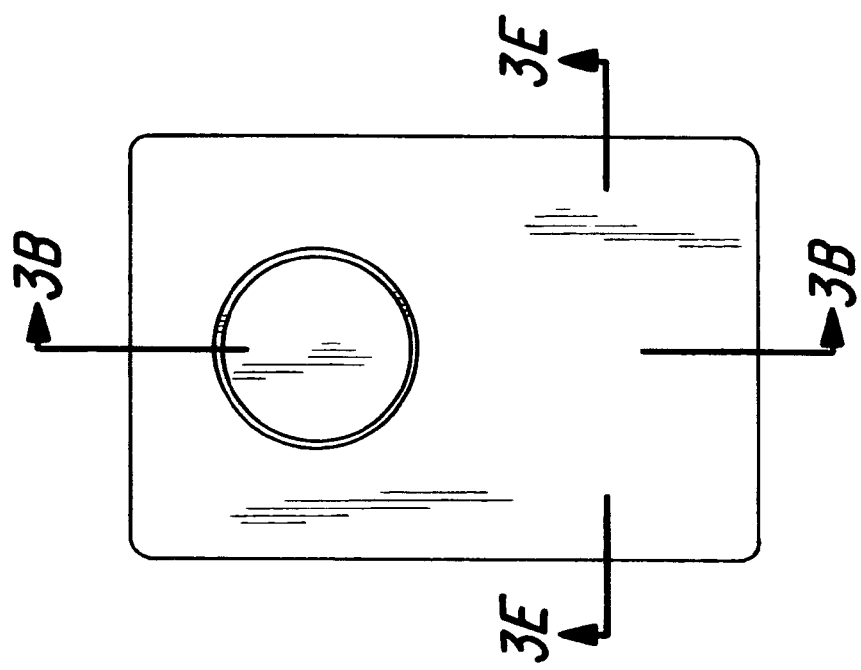
FIG. 3A is a top plan view of another embodiment of the self-centering shaft adapter of the invention utilizing a single pinion rack and pinion centering system.
Figure 3C:
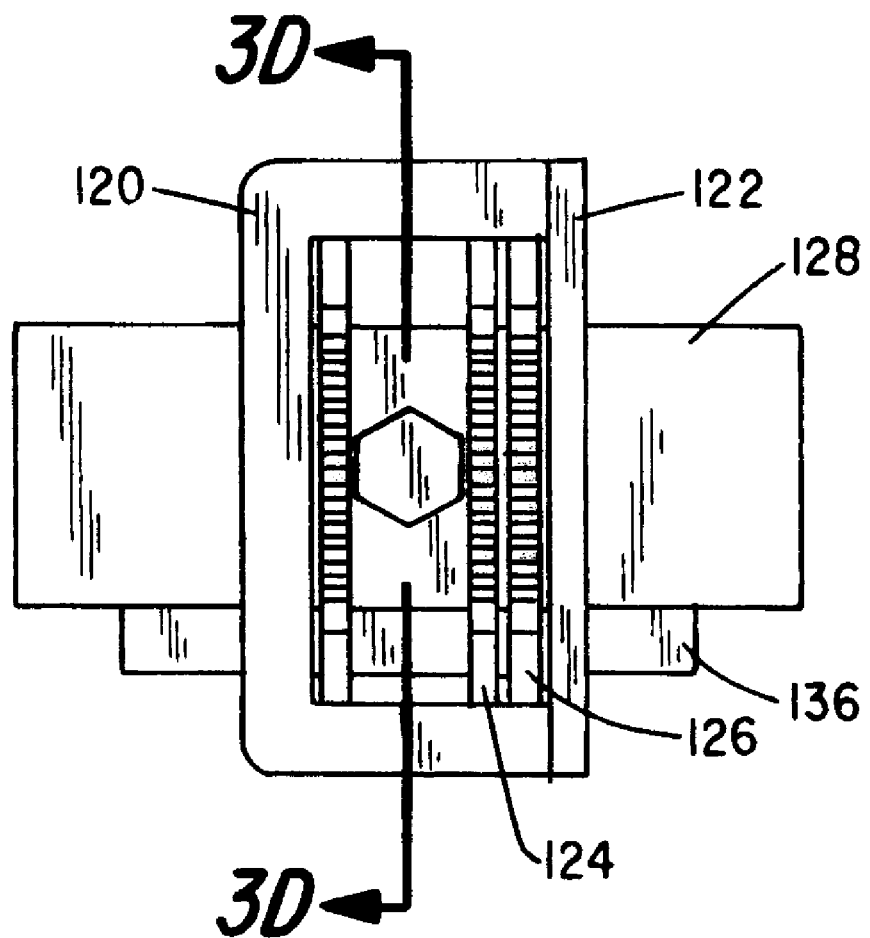
FIG. 3C is a bottom end view of the embodiment of 3A.
Figure 3E:
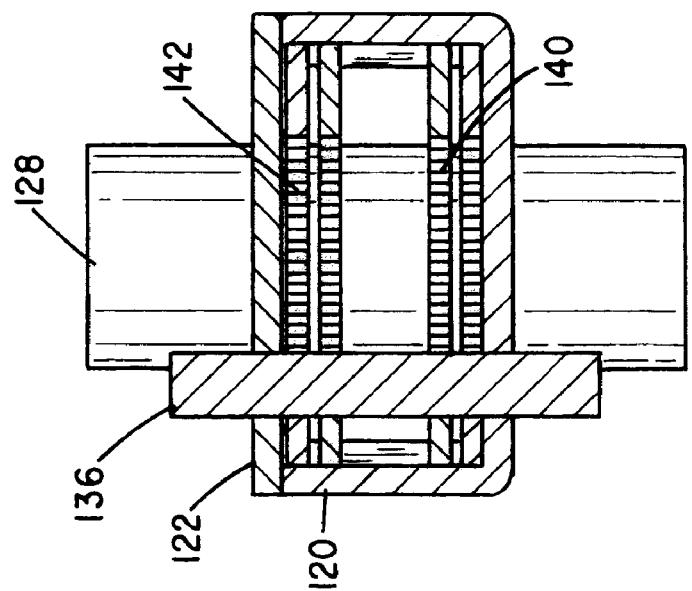
Figure 3D:
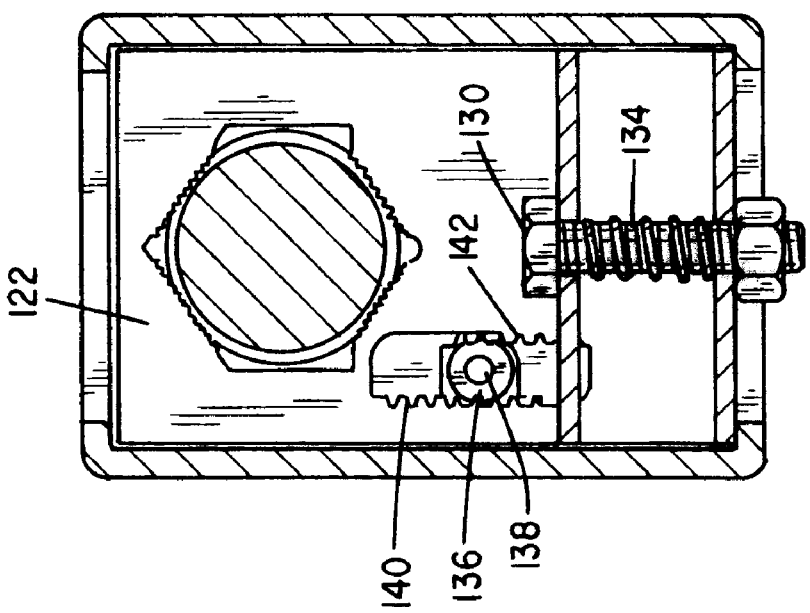

A somewhat similar arrangement in an alternate embodiment is depicted in the several views of FIGS. 2A–2E. As seen generally at 80, in the exploded view of FIG. 2A, there is provided a lower housing 82 configured to receive an upper housing 84. U-shaped inner (upper) jaw clamp 86 and U-shaped outer (lower) jaw clamp 88, T-bolt 90, nut 92 and compression spring 94 are also shown. A single centering cam member 96 configured to nest in a recess 98 in the lower housing 82 is provided with a pair of opposed (180° apart) raised extensions or tabs 100 (see FIG. 2D). The upper (inner) jaw 86 is provided with a notch 102 and cutout 104 (FIG. 2D) in the lower flange; and the lower flange of the outer (lower) jaw clamp 88 is likewise constructed in opposite relation with notch 106 and recess 108. A shaft to be captured is pictured at 110 and a splined integral driving hub is shown attached to the outer housing at 112. As was the case with the embodiment of FIG. 1, the centering cam member 96 with raised tabs 100 operates in conjunction with the notches 102, 106 in the respective jaws 86 and 88 to center a shaft of any diameter as at 110 with respect to the hub 112 (FIG. 2E).

FIGS. 3A–3E depict another embodiment which accomplishes shaft diameter-independent centering using a rack and pinion system. That device includes housing members 120 and 122 enclosing the U-shaped upper (inner) jaw 124 and lower (outer) U-shaped jaw 126 shown capturing a shaft 128. A clamping bolt 130 with nut 132 and biasing compression spring 134 are included. This embodiment is further provided with a pinion 136 mounted on a fixed shaft 138 and designed to rotate about the shaft in response to the movement of a pair of spaced rack members 140 and 142, respectively fixed to the upper (inner) and lower (outer) jaw members 124 and 126. In this manner, movement of the jaw in equal distance in opposite directions is assured as they are opened and closed about a shaft at 128 by rotation of the nut 132. As with other embodiments, the outer housing is attached to the output hub of a direct coupled actuator. Also, as with the other embodiments, all of the clamping force is provided by the bolt and nut system whereas the operating torque is transmitted between the interface of the jaws and the housing.

Figure 4A:
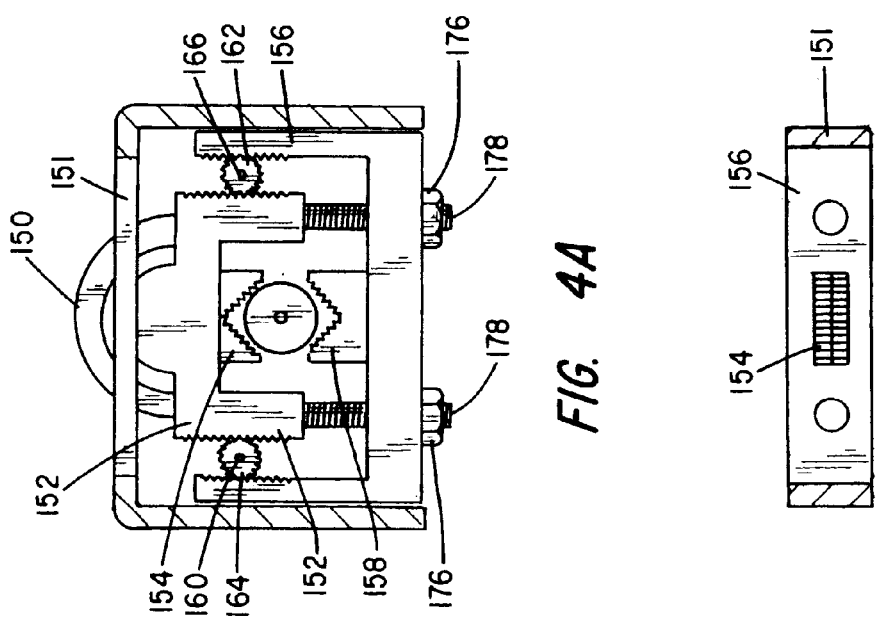
FIG. 4A is a partially cut-away top view of an alternate embodiment showing internal parts and employing a pair of rack and pinion systems.
Figure 4B:
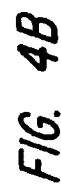
FIG. 4B is a bottom view of FIG. 4A.

FIGS. 4A and 4B depict an alternate form of a rack and pinion operated self-centering device using dual rack and pinion systems. The device includes a U-bolt 150 carried in a frame member 151 carrying an upper or inner casting 152 which, in turn, includes a jaw member 154 and a lower or outer casting 156 which carries a lower jaw 158. A pair of pinions 160, 162 carried on shafts 164, 166 fixed to the outer housing (not shown) engage respectively upper and lower rack portions 168, 170 and 172, 174 on either side of the upper or inner casting 152. Clamping is provided by a pair of nuts 176 attached to the ends 178 of U-bolt 150.

Figure 5:
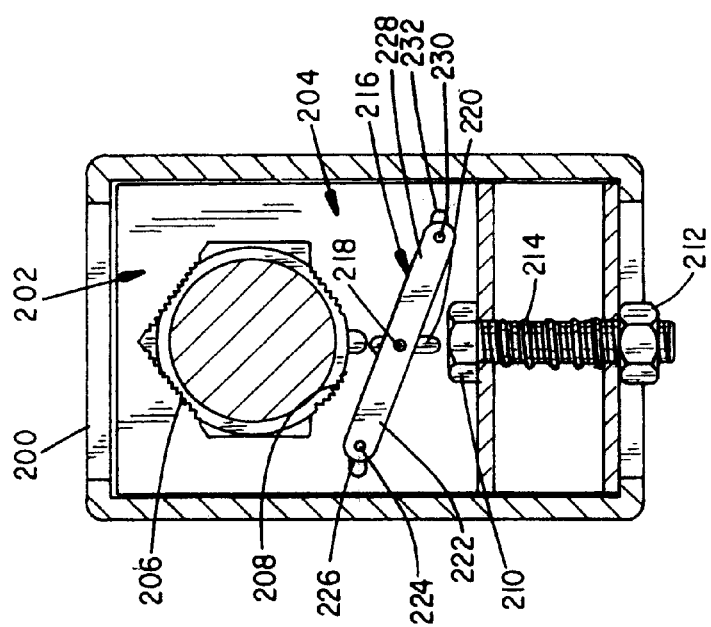
FIG. 5 is a top view of yet another embodiment which utilizes a beam-type centering arrangement.

FIG. 5 illustrates a beam version of a self-centering shaft adapter and includes an outer housing 200 in which is mounted a U-shaped upper jaw 202, a U-shaped lower jaw 204, the jaws having respective shaft engaging teeth 206 and 208. Reciprocal operation for opening and closing the jaws is provided by a T-bolt 210 with nut 212 and biasing compression spring 214 in the manner of previously described embodiments as discussed above in regard to FIGS. 1–3. A pivot arm 216 is provided which is mounted on a pivot shaft 218 fixed to the outer housing through a clearance slot 220. End 222 of pivot arm 216 is provided with a pin 224 which engages a slot 226 in the upper jaw 202. End 228 is provided with a pin 230 which engages a slot 232 in the lower jaw 204. This system allows centering adjustment as the jaws are opened and closed to accommodate different diameter shafts.

Figure 6:
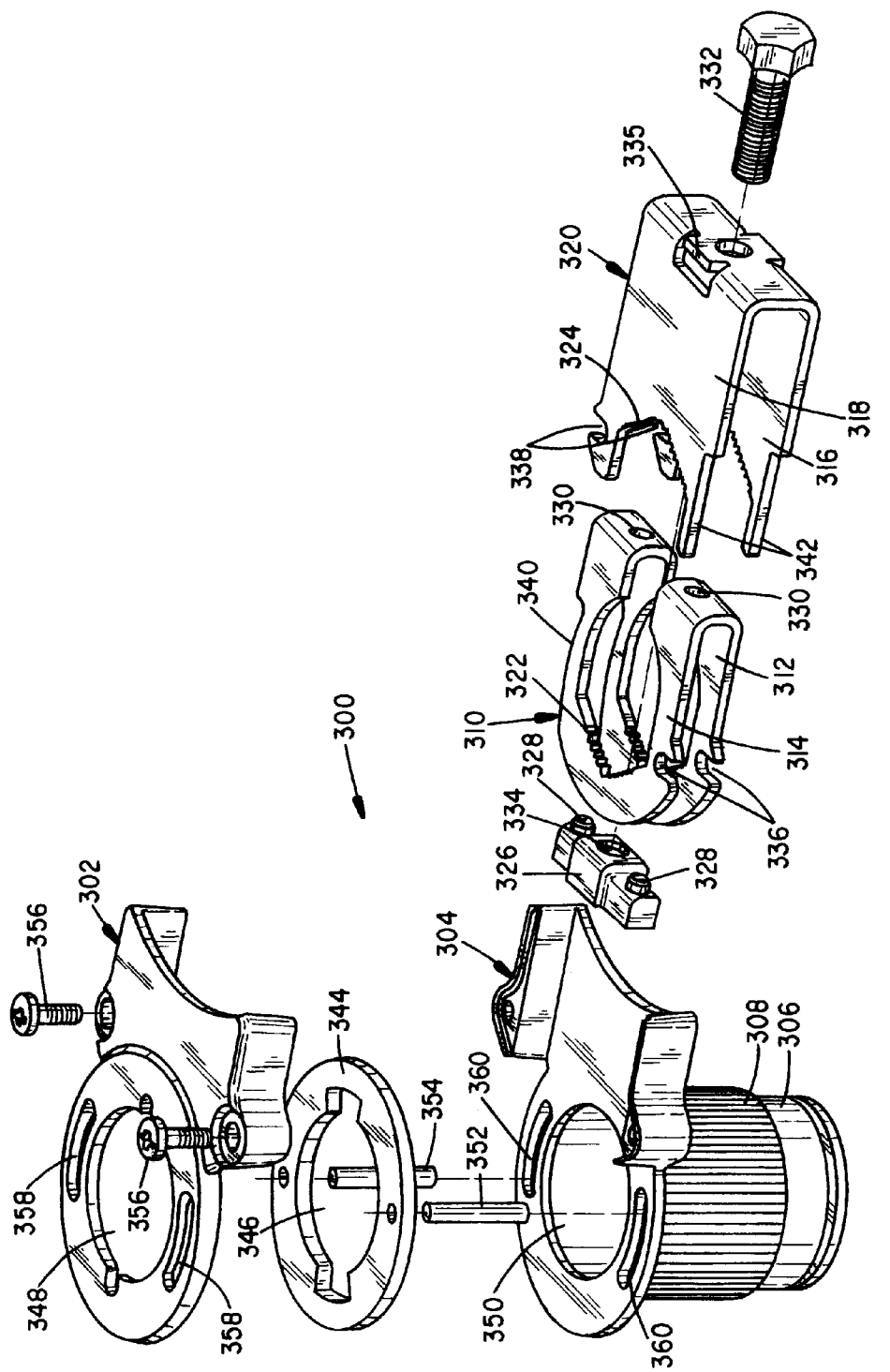
FIG. 6 is an exploded perspective view of an embodiment similar to that shown in FIG. 1 with certain modifications.

In the exploded perspective view of FIG. 6, there is illustrated a cam-operated embodiment similar to that shown in FIG. 1 and FIG. 2A–2E, but in a somewhat simplified and more compact form. This embodiment, generally at 300, includes an upper housing 302 and a lower housing 304 which includes an integral driving hub 306 with outer splines 308 adapted to be received in a driving actuator mechanism (not shown). A generally U-shaped inner (upper) jaw clamp member 310 with spaced parallel sides 312, 314 is designed to be contained within and slide reciprocally relative to the spaced parallel sides 316, 318 of an outer (lower) U-shaped jaw clamp member 320. The spaced parallel sides 312, 314, 316 and 318 include respective opposed parallel toothed fractions 322 and 324 which are designed to converge and clamp a shaft of interest therebetween.

The jaw clamp members 310 and 320 are retained and operated to open and close using an internally threaded member 326 having projections 328 press fit into matching openings 330 in the base of inner (upper) jaw clamp member 310. A partially threaded bolt device 332 carried within and free to rotate relative to outer (lower) jaw clamp member 320 is designed to be threaded into member 326 at 334 and is used to adjust the span of the jaw clamp members 310 and 320. The bolt device 332 is retained within the lower jaw 320 by a hollow member 335 in which it is free to rotate. No spring is necessary as the jaws are easily pried apart by hand, however, one can be provided if desired.

Notches or slots 336 are aligned on one side of base parallel sides 312 and 314 of upper jaw clamp member 310 and in the opposite side (as assembled) of base sides 316, 318 of lower jaw clamp member 320 at 338. Corresponding accommodating clearance recesses are notched in the jaw clamp member sides opposite the notches at 340 and 342. A single round, relatively flat cam member 344 having a central opening 346, which aligns with central openings 348 and 350 in upper and lower housing members 302 and 304, respectively, carries a pair of opposed follower pins 352, 354 on the opposite side thereof and spaced 180° apart. The pins extend perpendicular to the plane of the cam element 344. The housing is fastened together using threaded fasteners 356.

This system operates in the same manner as the embodiment of FIG. 1 with the follower pins 352 and 354 extending through the notches 336 and 338 in jaw members 310 and 320, and the relative movement of the jaw members 310 and 320 operating through the pins to rotate the cam member 344 so that the upper and lower jaw movement is equal distance from the center of a captured shaft which, in turn, remains co-incident with the center line of the driving hub 306.

It should be noted that in this embodiment, the threaded adjustment device 332 need not protrude beyond the confines of the housing making the system more compact. The housing member 302 is provided with curved slots 358 and lower member 304 with curved slots 360 which accommodate and guide the follower pins 352 and 354 eliminating the need for a second cam element.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. An adapter for detachably concentrically coupling shafts having a range of diameters to a rotating input actuator capable of rotating about a rotational axis, comprising:
   (a) a housing having a hub adapted to be driven by a rotating input and having a housing opening adapted to receive one end of a shaft;
   (b) a pair of adjustable converging jaw members in the housing for capturing shafts of varying sizes;
   (c) a self-centering adjustment system for opening and closing the converging jaw members thereby defining a jaw opening therebetween while maintaining the center between the converging jaw members concentric with the rotational axis of said hub; and
   (d) wherein the clamping force to transfer rotational torque between said shaft and said hub is generated independent of said self-centering adjustment system.

2. An adapter as in claim 1 wherein said self-centering adjustment system is centered by means of an adjustment mechanism selected from the group consisting of rotating cam-operated, rack and pinion operated and beam mechanisms.

3. An apparatus as in claim 2 wherein said self-centering adjusting mechanism is a beam mechanism.

4. An apparatus as in claim 3 wherein said jaw members include an upper jaw member nested within a lower jaw member, each of said jaw members being provided with a jaw slot and a central slot in said housing aligned between said jaw slots; and wherein said centering mechanism includes a beam member having a central mount adapted to ride in said central slot and end mounts one connected to ride in each of said jaw slots thereby producing equal movement of the jaws about a moving center pivot.

5. An adapter as in claim 1 wherein said converging jaw members are generally U-shaped with spaced parallel sides and wherein said pair includes an upper jaw member nested within a lower jaw member, each of said jaw members having a jaw notch in one side thereof and wherein said adjustment mechanism comprises a ring-shaped rotating centering cam member in said housing having a pair of fixed operating members spaced apart and extending away from a common surface of the cam member such that each of said operating members engages one of said jaw notches associated with a different one of said jaw members so that the relative motion of the jaw members to open or close produces rotational displacement of said centering cam member, the center of the cam member and jaw opening remaining constant.

6. An adapter as in claim 5 wherein each of said jaw members is provided with a pair of aligned jaw notches, one in each parallel side and wherein the operating members of the centering cam extend to engage both.

7. An adapter as in claim 6 further comprising a ring-shaped rotating retaining cam member having spaced openings thereon adapted to receive the free ends of said operating members, said jaw members thereby being captured between said centering cam member and said retaining cam member.

8. An adapter as in claim 1 wherein said self-centering adjustment system for opening and closing the converging jaw members includes a centering mechanism that comprises a rack device associated with each said jaw members and a common rotating pinion enmeshed with both rack devices in a manner such that relative movement of said jaw members causes rotation of said pinion and displacement of said jaw members an equal distance in opposite directions.

9. An adapter as in claim 8 wherein said jaw members are generally U-shaped and include an upper jaw member nested within a lower jaw member, each of said jaw members being provided with a slot therethrough, one side of which is provided with rack teeth such that, when the jaws are assembled, the slots are aligned with the teeth of the respective jaws on opposite sides of the slot and wherein said pinion is mounted for rotation on a fixed shaft aligned with said slot.

10. The apparatus of claim 8 wherein said converging jaw members are generally U-shaped with spaced parallel sides and include an upper jaw member nested within a lower jaw member in opposed relation, the outer edges of said inner jaw member facing said outer jaw member are provided with a series of outward facing rack teeth and wherein inner surfaces of said outer jaw member are provided with a series of rack teeth facing the rack teeth on said inner jaw member and a pair of pinion members are mounted to rotate between and engage the inner and outer jaw rack teeth on each side of said inner jaw thereby assuring equal travel between the upper and lower jaw members as they are displaced relative to each other.

11. The apparatus of claim 10 wherein said upper jaw member further comprises a pair of threaded members, one associated with each leg of the "U" adapted to be mounted through openings in said lower jaw and, a pair of threaded nut members mounted on said threaded members for adjusting the spacing of said jaws.

12. An adapter as in claim 1 wherein said jaw members are generally U-shaped and said pair includes an upper jaw member nested within a lower jaw member, the relative motion therebetween determining the opening between them and wherein said adjustment mechanism further comprises a spring-biased threaded bolt and nut arrangement for adjusting said opening.

13. An adapter as in claim 1 wherein said jaw members are generally U-shaped and said pair includes an upper jaw member nested within a lower jaw member, the relative motion therebetween determining the opening between them and wherein said adjustment mechanism further comprises an internally threaded member carried in one of said jaws and an adjusting externally threaded member carried in the other of said jaws.

14. An adapter for detachably concentrically coupling shafts having a range of diameters to a rotating input actuator capable of rotating about a rotational axis, comprising:

(a) a housing having a hub adapted to be driven by a rotating input and having a housing opening adapted to receive one end of a shaft;
(b) a pair of adjustable converging jaw members in the housing for capturing shafts of varying sizes;
(c) a self-centering adjustment system that includes a rotating centering cam member for opening and closing the converging jaw members thereby defining a jaw opening therebetween while maintaining the center between the converging jaw members concentric with the rotational axis of said hub; and
(d) wherein the clamping force to transfer rotational torque between said shaft and said hub is generated independent of said self-centering adjustment system.

15. An adapter as in claim 14 wherein said converging jaw members are generally U-shaped with spaced parallel sides and wherein said pair includes an upper jaw member nested within a lower jaw member, the relative motion therebetween determining said jaw opening, each of said jaw members having a jaw notch in one side thereof and wherein said rotating centering cam member comprises a ring-shaped member nested in said housing and having a pair of fixed operating members spaced apart and extending away from a common surface of the cam member such that each of said operating members engages one of said jaw notches associated with a different one of said jaw members so that the relative motion of the jaw members to open or close produces rotational displacement of said centering cam member, the center of the cam member and jaw opening remaining constant.

16. An adapter as in claim 15 wherein each of said jaw members is provided with a pair of aligned jaw notches, one in each parallel side and wherein the operating members of the centering cam extend to engage both.

17. An adapter as in claim 16 further comprising a ring-shaped rotating retaining cam member spaced from said centering cam member having spaced openings thereon adapted to receive the free ends of said operating members, said jaw members thereby being captured between said centering cam member and said retaining cam member.

18. An adapter as in claim 15 including a threaded bolt member for controlling the relative motion of the jaw members.

19. An adapter as in claim 18 wherein said threaded bolt member extends internally only during jaw adjustments.

* * * * *